No. 892,481. PATENTED JULY 7, 1908.
J. WIEDEN.
GLASS FRONT FOR AUTOMOBILES.
APPLICATION FILED OCT. 2, 1907.
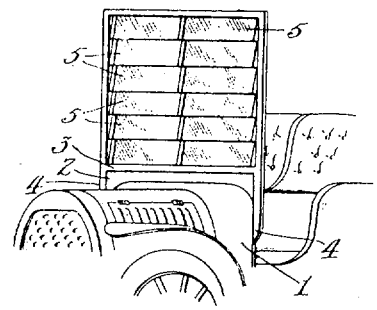
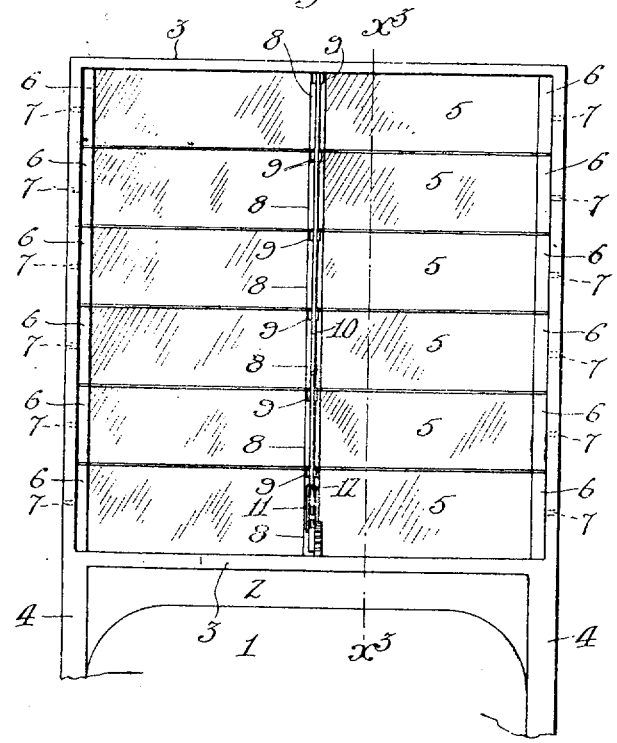
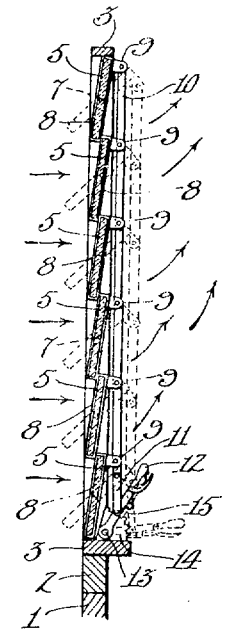

UNITED STATES PATENT OFFICE.

JULIUS WIEDEN, OF LOS ANGELES, CALIFORNIA.

GLASS FRONT FOR AUTOMOBILES.

No. 892,481. Specification of Letters Patent. Patented July 7, 1908.

Application filed October 2, 1907. Serial No. 395,631.

*To all whom it may concern:*

Be it known that I, JULIUS WIEDEN, a citizen of the United States, residing at Los Angeles, in the county of Los Angeles and State of California, have invented a new and useful Glass Front for Automobiles, of which the following is a specification.

This invention relates to a glass front for automobiles, and the object of the invention is to provide for securing ventilation back of the glass front.

With glass fronts as ordinarily constructed the air back of the glass front is dead and there is little or no ventilation even when running at quite a high speed, and it is to overcome this objection that the present invention is designed.

A further object is to provide for securing a uniform distribution of fresh air behind the glass front, and a still further object is to provide for regulating the amount of ventilation, so that if the device is regulated for any amount of fresh air the same will be evenly distributed back of the glass front.

A further object is to cause a general upward movement of the fresh air admitted back of the glass front, so that the incoming air will not strike the bodies or faces of those sitting behind the glass front, but the force of the incoming air will be reduced and caused to commingle, thereby promoting uniform distribution, and no disagreeable wind pressure will be concentrated at any point which would chill the persons behind the glass front.

A further object of the invention is to provide for ready adjustment of the ventilation by a single lever which may be manipulated by one hand, there being no bolts or clamps to be loosened or fastened, and the regulation of the ventilation is accomplished by merely shifting the lever, thus the device may be adjusted by one person without assistance and with equal facility whether the car be standing still or running.

Although the fresh air is supplied from a large number of places directly through the glass front there is no impedance to the vision.

Other advantages and objects will be brought out in the following specification.

The accompanying drawings illustrate the invention, and referring thereto:—Figure 1 is a perspective view showing the front portion of an automobile equipped with the glass front. Fig. 2 is a rear elevation, on a larger scale, of the glass front. Fig. 3 is a section on line $x^3$—$x^3$ Fig. 2.

1 designates the dash of the automobile above which is arranged a board 2, and above the board 2 is the frame 3 of the glass front, the said frame being formed of wood or metal, as may be desired, and which is attached to the dash 1 and board 2 by side bars 4. A series of glass panels 5 are arranged transversely of the frame 3, and each has a metal cap 6 at each end with pivots 7 which are journaled in the frame 3.

As shown in Fig. 3, the width of the panels 5 is such that when closed they slightly overlap each other. A metal strap 8 is arranged around each panel 5 at its center, and the straps 8 are provided with ears 9, and all of the ears are connected with an operating bar 10, the lower end of which is connected by a link 11 with a hand lever 12 pivoted at 13 to a sector 14 on the lower bar of the frame 3. The hand lever 12 is provided with a latch 15 which is adapted to engage in notches in the sector 14 to rigidly hold the hand lever in the position set, and by swinging the hand lever the operating bar 10 may be moved up or down to swing the panels 5 into the desired angular position. It will be seen that owing to the thickness of the straps 8 and caps 6 there will be a slight space between the overlapping panels 5 when they are closed, as the thickness of straps 8 and caps 6 prevent the glass panels from touching each other, and thus a certain amount of ventilation is always afforded.

I have found that a minimum amount of ventilation is always desirable and to that end provide for the same in this manner. If it is desired to increase the amount of air which is admitted, the hand lever may be swung down into the position shown in dotted lines in Fig. 3, which will turn the panels 5 into position shown in dotted lines and admit a large quantity of air. This amount may be reduced by raising the hand lever to partially close the panels and in this manner the panels may be adjusted to permit the exact amount of ventilation required.

As indicated by the arrows in Fig. 3, the air is deflected upwardly in passing between the panels so that it does not strike directly against the persons behind the glass front. If the inrushing air was permitted to enter through one place only the blast would be concentrated and the persons would be chilled in consequence, but this construction causes the air to be diffused throughout the space back of the glass front and ventilation is thus secured without ill effects but with comfort and pleasure to those riding.

What I claim is:—

1. A glass front for automobiles comprising a frame, means for attaching the frame to an automobile, a series of transparent panels pivoted in the frame, an operating bar connected with all of the panels, a strap around the center of each panel, each strap having an ear, an operating bar connected to the ears, a hand lever pivoted on the frame, a link connecting the hand lever to the operating bar, a sector, and latch mechanism for latching the hand lever in position on the sector.

2. In a glass front for automobiles, a frame, means for attaching the frame to an automobile, a series of glass panels arranged transversely in the frame, a cap on each end of each panel, the caps being pivoted to the frame, a band on each panel, ears projecting from the bands, an operating bar connecting said ears, a hand lever connected with the operating bar, and means for detachably locking the hand lever in the position set.

3. A glass front for automobiles comprising a frame, means for attaching the frame to an automobile, a series of transparent panels pivoted in the frame means for adjusting the panels, and means on the panels acting as stops to form air spaces between the edges of the panels when closed.

4. A glass front for automobiles comprising a rigid frame, adapted to be secured to the front of the automobile, a plurality of transparent rigid panels having their ends pivotally secured in the frame, and means for simultaneously regulating the angular position of the blades.

In testimony whereof, I have hereunto set my hand at Los Angeles, California, this 25th day of September, 1907.

JULIUS WIEDEN.

In presence of—
GEORGE T. HACKLEY,
FRANK L. A. GRAHAM.